Patented Oct. 28, 1947

2,429,965

UNITED STATES PATENT OFFICE 2,429,965

BREAKING OF EMULSIONS

Alexander Paterson Shearer, Leslie Benjamin Witten, and Thomas Cubin, Sunbury-on-Thames, England No Drawing. Application December 4, 1945, Serial No. 632,816. In Great Britain December 4, 1944

8 Claims. (Cl. 252—331)

The invention relates to the breaking of sulphuric acid-hydrocarbon emulsions particularly such as are produced in the operation of the well known sulphuric acid-alkylation process applied to isobutane or isopentane under such conditions as to yield a liquid alkylation product from which saturated isoparaffin derivatives boiling in the motor spirit range, may be separated by distillation.

In sulphuric acid-alkylation plants provision is made between the reactor and the alkylate recovery section of the plant for a settling zone, the capacity of which is such that the acid-hydrocarbon emulsion will have time to settle and separate into an acid layer and a hydrocarbon layer. The actual settling time allowed will depend on a number of factors such for example as the degree of mixing and the strength of the fresh and discarded acid. In practice the settling time allowed may be as short as ten minutes, or it may extend as long as two hours.

The factors that cause this wide variation in the stability of such emulsions have not been satisfactorily explained. It has been suggested that variation in acidity in the reactor may occasion the production of compounds having a stabilising effect on the emulsions. It has also been suggested that variations in the sulphuric acid-hydrocarbon ratio in the reactor may be a contributory cause, because such variations may result in the emulsion passing from a continuous hydrocarbon phase to a continuous acid phase, or vice versa. This inversion is reported to occur about the point at which the sulphuric acid-hydrocarbon ratio is 43:57.

From whatever cause the difficulties arise, emulsion troubles present an important problem in the industrial operation of sulphuric acid-alkylation plants, such as used in the alkylation of isoparaffins with olefines or hydrocarbon mixtures containing $C_3$ and $C_4$ olefines, in the presence of sulphuric acid of high concentration, carried out under conditions of intensive stirring of the reaction mixture. These difficulties arise partly on account of the loss in capacity resulting from prolonged settling times, and partly on account of corrosion and deposition troubles arising in the alkylate recovery system.

It is among the objects of the invention to provide means whereby such sulphuric acid-hydrocarbon emulsions may be rendered more tractable.

The invention is not restricted in its application to the breaking of emulsions formed in sulphuric acid-alkylation plants. It may be applied with comparable effects to emulsions formed in the sulphuric acid refining of hydrocarbons in general, where serious corrosion troubles frequently arise in the equipments used for processing acid-treated oils.

It is known to break emulsions by the use of antagonistic emulsifiers and by centrifuging methods, electrical methods, filtration methods and methods of heat treatment; and it is known that the difficulties hereinbefore described to some extent have been overcome by the use of an emulsifying agent, the principal constituent of which is stated to be a sodium soap.

We have now discovered that sulphuric acid-hydrocarbon emulsions of the type described may be rendered more tractable by the addition to and distribution in the fresh concentrated sulphuric acid used of a small proportion of a polymer composition such as may have been recovered from spent sulphuric acid which has been used in the treatment of hydrocarbons.

Since an important application of the invention is in the sulphuric acid-alkylation of isoparaffins such as isobutane or isopentane it may generally be convenient to recover the polymers from spent alkylation-acid. Many large refineries are already equipped with plant for the recovery of spent sulphuric acid, and the polymers separated out are regarded as a waste product. There are thus alternative ways of recovering the polymers, and while the method hereinafter described may be conveniently used, it presents no limitation to the scope of the invention.

In carrying the invention into effect, as a first step, spent alkylation acid is diluted to a substantial extent such for example as an approximate concentration of 50%, with fairly pure water, steam condensate being quite satisfactory for the purpose. The steam condensate is passed into a tank to a predetermined level, the tank being either open or closed. The spent alkylation acid is then run slowly into the tank until another predetermined level is reached, and during the addition the contents of the tank are agitated and heated to boiling point with steam and compressed air. When the contents of the tank reach boiling point and the hydrocarbons have separated out, the steam and air are shut off, and the contents of the tank allowed to settle for a long period that for example may be approximately four hours. At the end of this settling period, the acid is run off through an outlet in the bottom of the tank, and passes to a receiving tank. When it is observed that in the operation hydrocarbons come over with the acid, the flow is diverted to a polymer receiving tank in which the polymer "draw off" is positioned somewhat above the bottom of the tank, whereby any further acid which settles out may be excluded from the polymer, and drawn off through a separate outlet in the bottom of the tank The polymers recovered in this way may generally be liquid, but under certain conditions they may be either solid or highly viscous and therefore difficult or impossible to pump. Under such circumstances they may be diluted with, or dissolved in oil in quantity sufficient to render them adapted to be pumped.

Thus according to the invention there is added to the fresh acid charged to the process, a proportion that in general may not exceed 5% by weight of the acid, of an agent comprising the polymers recovered from acid tars produced in the treatment of hydrocarbons with sulphuric acid, whereby on the distribution of the agent in the acid-hydrocarbon emulsions the latter are rendered more tractable. The settling time allowed may thus be appreciably reduced, thereby minimising corrosion and other troubles that otherwise may arise in passing them through other parts of the plant.

The polymers require to be intimately mixed with fresh acid, and this may be done for example by introducing them into the acid either before or after the fresh acid pump. The mixture may then be passed through one or more orifice mixers and thereafter charged to the reaction zone.

The amount of polymers required to be added is small. We have obtained satisfactory results with considerably less polymers than 1% by weight of the acid, although the amount to be added may be controlled largely by the conditions which have to be counteracted. There is no objection to increase the amount added above 5% (although this is generally unnecessary), since deemulsification agents are inexpensive, and easy to obtain in a petroleum refinery, and their character is such that they will neither contaminate the products nor corrode the acid resistant plant.

The polymers employed may be solid or liquid and may be added to the fresh acid in either form, but usually as liquid. If the polymers recovered from the acid are solids, they may be mixed with a small quantity of oil, such for example as a light gas oil, to form a solution or a slurry, and may in that condition be pumped into the acid line, or fed by gravity into the acid pump suction.

The invention is particularly applicable to the types of alkylation plant that have a number of reactors and in which the acid flows in series through the reactors. In such plants particularly serious emulsion troubles are experienced in the settler following the first reactor, in which the fresh and highly concentrated sulphuric acid is used.

It is now widely recognised that there is an intimate relation between acid strength and quality of alkylate produced, the higher the acid strength the higher the quality of alkylate produced, and this is particularly true where the alkylating agent is a $C_4$ olefine.

We have found that the quality of the alkylate normally produced in the first stage of the sulphuric acid-alkylation process applied for example to isobutane, does not reach the level of quality that ought to be reached. We have also found that by operation according to the process of the invention a considerable improvement results, particularly in the quality of the alkylate product of the first stage.

We claim:

1. A process for breaking sulphuric acid-hydrocarbon emulsions formed in the sulphuric acid treatment of hydrocarbons, consisting in the addition and distribution in the fresh concentrated sulphuric acid admitted to the treating process of a polymer composition recovered from the concentrated sulphuric acid spent in the treatment in small proportion intimately admixed with the fresh acid.

2. A process for breaking sulphuric acid-hydrocarbon emulsions formed in the sulphuric acid treatment of hydrocarbons in which the acid having been spent in the treatment of the hydrocarbons, is diluted with a substantial proportion of water while the mixture is agitated and heated, the mixed liquids on reaching boiling point being allowed to settle for a long period not substantially exceeding four hours, and adding to and intimately mixing a small proportion of said recovered hydrocarbons with fresh acid admitted to the treating process the hydrocarbons recovered as liquids being separated as a supernatant layer upon the acid, and admitting to and distributing in the fresh acid admitted to the treating process, a small proportion of said hydrocarbons intimately admixed with a fresh acid.

3. A process for breaking sulphuric acid-hydrocarbon emulsions formed in the sulphuric acid treatment of hydrocarbons, consisting in the recovery of a polymer composition from the sulphuric acid of high concentration spent in the treatment, and admitting to and distributing in the fresh concentrated sulphuric acid of high concentration admitted to the treating process, a small proportion of the polymer composition intimately admixed with said fresh acid.

4. A process for breaking sulphuric acid-hydrocarbon emulsions formed in the sulphuric acid treatment of hydrocarbons, consisting in the recovery of a polymer composition from the concentrated sulphuric acid spent in the process, and distributing in the fresh sulphuric acid of high concentration admitted to the treating process, said polymer composition in a small proportion not substantially exceeding 5% of the acid, the polymer composition being intimately admixed with said fresh acid.

5. A process for breaking sulphuric acid-hydrocarbon emulsions formed in the known sulphuric acid-alkylation process applied to lower isoparaffins such as isobutane and isopentane to yield a liquid alkylation product from which saturated isoparaffin derivatives boiling in the motor spirit range are separated by distillation, in which a polymer composition recovered from sulphuric acid spent in the alkylation reaction is added in small proportion to the fresh concentrated sulphuric acid admitted to the sulphuric acid-alkylation process and intimately admixed with said fresh acid.

6. A process for breaking sulphuric acid-hydrocarbon emulsions formed in the known sulphuric acid-alkylation process applied to lower isoparaffins such as isobutane and isopentane, as specified in claim 5, in which the concentrated sulphuric acid spent in the alkylation reaction is first diluted with a substantial proportion of water, and the spent acid and water agitated and heated with steam and compressed air until boiling point is reached, whereupon the liquids are allowed to settle for a long period and the hydrocarbons which separate as a supernatant layer on the acid are employed as said polymer composition.

7. A process for breaking emulsions as specified in claim 5, in which the proportion of polymer composition admitted to the sulphuric acid-alkylation process does not exceed 5% by weight of the fresh concentrated sulphuric acid admitted to the process.

8. A process as specified in claim 1, in which the polymers recovered from the spent acid are in at least a highly viscous state, said polymers being first admixed with oil to render them flowable and in that condition fed into the fresh acid.

ALEXANDER PATERSON SHEARER.
LESLIE BENJAMIN WITTEN.
THOMAS CUBIN.

REFERENCES CITED

The following references are of record in the file of this patent:

UNITED STATES PATENTS

| Number | Name | Date |
|---|---|---|
| 2,211,747 | Goldsby et al. | Aug. 13, 1940 |
| 2,260,945 | Korpi et al. | Oct. 28, 1941 |
| 2,269,250 | Bruner | Jan. 6, 1942 |
| 2,286,184 | Bradley et al. | June 16, 1942 |
| 2,355,460 | Morrell | Aug. 8, 1944 |
| 2,399,206 | Castner | Apr. 30, 1946 |